(12) United States Patent
Srinivasan

(10) Patent No.: US 9,710,443 B2
(45) Date of Patent: Jul. 18, 2017

(54) SIMPLIFYING ACCESS TO DOCUMENTS ACCESSED RECENTLY IN A REMOTE SYSTEM

(75) Inventor: Suresh Srinivasan, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 717 days.

(21) Appl. No.: 12/176,414

(22) Filed: Jul. 21, 2008

(65) Prior Publication Data

US 2010/0017362 A1 Jan. 21, 2010

(51) Int. Cl.
*G06F 17/30* (2006.01)
*G06F 17/22* (2006.01)

(52) U.S. Cl.
CPC .... *G06F 17/2288* (2013.01); *G06F 17/30011* (2013.01)

(58) Field of Classification Search
CPC ......... G06F 17/30038; G06F 17/30067; G06F 17/30613; G06F 17/30867
See application file for complete search history.

(56) References Cited

U.S. PATENT DOCUMENTS

| | | | |
|---|---|---|---|
| 7,162,473 B2 | 1/2007 | Dumais et al. | |
| 7,363,330 B1* | 4/2008 | Ellman | G06F 17/30194 707/620 |
| 2002/0059288 A1* | 5/2002 | Yagi | G06F 3/0481 |
| 2003/0088570 A1* | 5/2003 | Hilbert et al. | 707/100 |
| 2004/0267700 A1* | 12/2004 | Dumais | G06F 17/30613 |
| 2005/0034134 A1* | 2/2005 | Lieblich | H04L 12/2602 719/318 |
| 2005/0114378 A1* | 5/2005 | Elien et al. | 707/102 |
| 2005/0165935 A1* | 7/2005 | Moody | G06F 11/302 709/228 |
| 2005/0192966 A1* | 9/2005 | Hilbert et al. | 707/10 |
| 2005/0278302 A1 | 12/2005 | Ritter | |
| 2006/0218499 A1 | 9/2006 | Matthews et al. | |
| 2007/0123226 A1* | 5/2007 | Liang et al. | 455/414.1 |
| 2008/0005685 A1 | 1/2008 | Drews et al. | |
| 2009/0144283 A1* | 6/2009 | Clark | G06F 17/30144 |

OTHER PUBLICATIONS

"Jonathan Trevor et al", "Anyspot: Pervasive Document Access and Sharing", "http://www.fxpal.com/publications/FXPAL-PR-07-402.pdf", Date: Jul.-Sep. 2007, pp. 76-84, Pervasive Computing, IEEE Computer Society Publication, vol. 6 No. 3.

"Concept World", "Recent X", "http://www.conceptworld.com/RecentX/rx_power_of_recentx.asp" Downloaded Circa: Feb. 27, 2008, pp. 1-2.

(Continued)

*Primary Examiner* — Son T Hoang

(74) *Attorney, Agent, or Firm* — IPHorizons PLLC; Narendra Reddy Thappeta

(57) ABSTRACT

Simplifying access to documents accessed recently on a remote system. In one embodiment, the list of documents accessed by a user using a first instance of an application in a first/remote system is maintained. The list of documents is provided/displayed to the same user when using a second instance of the same application on a second/local system, thereby facilitating the user to access the documents accessed recently on the remote system.

25 Claims, 7 Drawing Sheets

(56) References Cited

OTHER PUBLICATIONS

"Flexigensoft", "Actual Doc", "http://www.flexigensoft.com/actualdoc", Downloaded Circa: Feb. 27, 2008, pp. 1-9.
"X2NET Recent Documents", "http://www.download32.com/x2net-recent-documents-i35308.html", Release Date: Sep. 29, 2005, pp. 1-2.
"X2NET Recent Documents 3.0.2.0", "http://www.download32.com/x2net-recent-documents-s35308.html", Release Date: Sep. 29, 2005, pp. 1-2.
"Documeron 2.1- Advanced Recent Documents Manager", "http://www.softpedia.com/get/Office-tools/Other-Office-Tools/Documeron.shtml", Downloaded Circa: Aug. 1, 2008, pp. 1-2.
"Documeron 2.1", "http://www.softpedia.com/progScreenshots/Documeron-Screenshot-66770.html", Downloaded Circa: Aug. 4, 2008, pp. 1-2.
"Alltopsoft", "Recent Documents 2002 v.2.0", "http://www.alltopsoft.com/Desktop/Miscellaneous/Recent-Documents-2002.html", Downloaded Circa: Feb. 27, 2008, pp. 1-2.
"Excel Recent File List Software 7.0", "http://www.download32.com/excel-recent-file-list software-i5239.html", Release Date: Feb. 8, 2006,pp. 1-2.
"Excel Recent File List Software 7.0", "http://www.download32.com/excel-recent-file-list software-s5239.html ", Release Date: Feb. 8, 2006, pp. 1-2.
"X2NET Limited"," X2NET Recent Documents", "http://www.x2net.com/recentdocuments/index.htm?x2nrdsource=pad",Copyright Date: 2005, Downloaded Circa: Feb. 2008, p. 1.
"Multiplex Developments", "Documeron—Advanced Recent Documents Manager", "http://documeron.mutexdevelopments.com/index.html", Copyright Date: 2006-2008, Downloaded Circa: Feb. 2008, p. 1.

\* cited by examiner

Editor Application

File  Edit  View  Insert  Format  Help

Arial ▾ | 10 ▾ | Western ▾ | B *I* U

Lorem ipsum dolor sit amet, consectetuer adipiscing elit. Maecenas id nisi a augue adipiscing commodo. Aliquam pellentesque ullamcorper libero. Curabitur rhoncus ipsum a magna. Mauris at leo sed arcu molestie convallis. Pellentesque egestas erat a orci. Nam rhoncus elit at ipsum. Aenean consectetuer purus quis pede. Pellentesque fringilla mauris hendrerit sem. Morbi dapibus vehicula pede. Fusce sagittis, neque vel mollis suscipit, ante libero vestibulum nisi, id vehicula risus dolor quis urna. Sed in est vel diam luctus viverra.

Nulla pellentesque tellus a sapien. Fusce consequat. Donec euismod, enim sit amet facilisis aliquam, risus tortor convallis enim, sed dapibus orci eros ut elit. Duis et lacus. Vivamus consequat iaculis purus. Aliquam vestibulum pede nec sapien. Duis commodo lacinia ipsum. Nam non felis vitae eros facilisis lobortis. Donec ac lacus vitae ligula bibendum ullamcorper. Etiam fringilla. Vestibulum ante ipsum primis in faucibus orci luctus et ultrices posuere cubilia Curae; Proin a tellus. Duis eget est. In enim dui, condimentum eget, fringilla id, consequat eget, dolor. Nulla at augue quis eros accumsan mollis.

Cras tincidunt felis vel nisl. Quisque molestie aliquam leo. Mauris aliquam eleifend tortor. Duis imperdiet justo. Curabitur vitae diam a lacus tincidunt placerat. Suspendisse potenti. Praesent luctus nunc nec ipsum. Nullam sed pede eu sapien elementum elementum. Mauris sapien. Ut bibendum, odio eu consequat tincidunt, neque lorem tempus ante, id mollis augue elit ornare felis. Pellentesque gravida ante nec felis mollis malesuada. Suspendisse potenti. Nulla gravida augue vulputate arcu. Nullam imperdiet facilisis lorem.

File: Z:\products\docs\version1.doc

*FIG. 3*

```
621: <ManagerConfig application="Editor">
622:   <DocumentList username="Bagha" maxCount="10">
623:     <Document id="1">
624:       <Name>version1.doc</Name>
625:       <Location type="mapped">Z:\products\docs\</Location>
626:       <LastAccessed>12-June-2008 11.56 AM</LastAccessed>
627:     </Document>
628:     <Document id="2">
629:       <Name>explist.txt</Name>
630:       <Location>D:\expenses\</Location>
631:       <LastAccessed>11-June-2008 09.22 AM</LastAccessed>
632:     </Document>
633:     <Document id="3">
634:       <Name>lettertoeditor.doc</Name>
635:       <Location>D:\letters\</Location>
636:       <LastAccessed>10-June-2008 1.05 PM</LastAccessed>
637:     </Document>
638:   </DocumentList>
639: </ManagerConfig>
```

*FIG. 6A*

```
671: <AgentConfig application="Editor">
672:   <ManagerList username="Bagha">
673:     <Manager id="1">
674:       <Connection address="120.3.40.2" type="VPN">
675:         <Parameter name="username" value="djmathew" />
676:         <Parameter name="password" value="zipzap" />
677:       </Connection>
678:     </Manager>
679:     <Manager id="2">
680:       <Connection address="www.remotedocs.net/djmat/" type="HTTP">
681:         <Parameter name="certificate" value="file://datacert/djmat.cer" />
682:       </Connection>
683:     </Manager>
684:   </ManagerList>
685: </AgentConfig>
```

*FIG. 6B*

SIMPLIFYING ACCESS TO DOCUMENTS ACCESSED RECENTLY IN A REMOTE SYSTEM

BACKGROUND

Technical Field

The present disclosure relates to document access, and more specifically to simplifying access to documents accessed recently in a remote system.

Related Art

Digital processing systems often enable desired information to be stored and manipulated in the form of electronic documents. An electronic document (hereafter "document") generally contains text, images/graphics, audio clips, links to other documents, etc., (in general, any content) according to a pre-specified format. Documents are generally stored on a non-volatile storage (such as a hard disk) associated with the digital processing system.

A user using a digital processing system may wish to access different documents. Accessing of documents refers to the process of retrieving the information stored in the non-volatile storage for the performance of desired actions such as viewing the content of the document, adding/editing/deleting portions of the content of the document, etc. The user may be required to specify the details of the document such the name, location, etc. for accessing the desired document.

As is well known, a digital processing system often maintains a list of documents recently accessed by the user. Such a list enables the user to merely select the desired documents to be accessed (again) without specifying the document details such as name, location, etc., thereby simplifying access to the desired documents.

It may be desirable that the user be provided such a list of documents recently accessed on a remote system (i.e., a digital processing system previously being used by the user), for simplified access of the remote documents (accessed previously from the remote system).

BRIEF DESCRIPTION OF THE DRAWINGS

Example embodiments of the present invention will be described with reference to the accompanying drawings briefly described below.

FIG. 3 depicts a portion of a display screen depicting the manner in which a user may access a document using an application in a remote system.

FIG. 6A depicts a portion of the data stored depicting the set of documents accessed recently in a remote system.

FIG. 6B depicts a portion of the data stored depicting the various information used to connect and communicate to a remote system from a local system.

In the drawings, like reference numbers generally indicate identical, functionally similar, and/or structurally similar elements. The drawing in which an element first appears is indicated by the leftmost digit(s) in the corresponding reference number.

DESCRIPTION OF EXAMPLE EMBODIMENTS

1. Overview

A computing system provided according to an aspect of a present invention includes a first system, a second system and a manager module. A user may execute a first instance of an application and accesses a set of documents using the first system. The manager module maintains a list of the set of documents accessed by the user. A second system may execute a second instance of the same application and include the list in a set of recently accessed documents by the user using the second instance of the application.

In an embodiment, the second instance is designed to receive an indication that the user has selected a first document contained in the set of documents, and the second system retrieves the first file from the first system and displays the first document to the user. The accessing of documents on the remote system is thus simplified.

According to another aspect of the present invention, the second system store a configuration file indicating address of the first system and an authentication information of the user. The data in the configuration file may be automatically used to retrieve the list from the first system and include the retrieved list in the set of recently accessed documents of the second instance of the user application.

Several aspects of the invention are described below with reference to examples for illustration. However one skilled in the relevant art will recognize that the invention can be practiced without one or more of the specific details or with other methods, components, materials and so forth. In other instances, well-known structures, materials, or operations are not shown in detail to avoid obscuring the features of the invention. Furthermore the features/aspects described can be practiced in various combinations, though only some of the combinations are described herein for conciseness.

2. Example Environment

Figure 1:
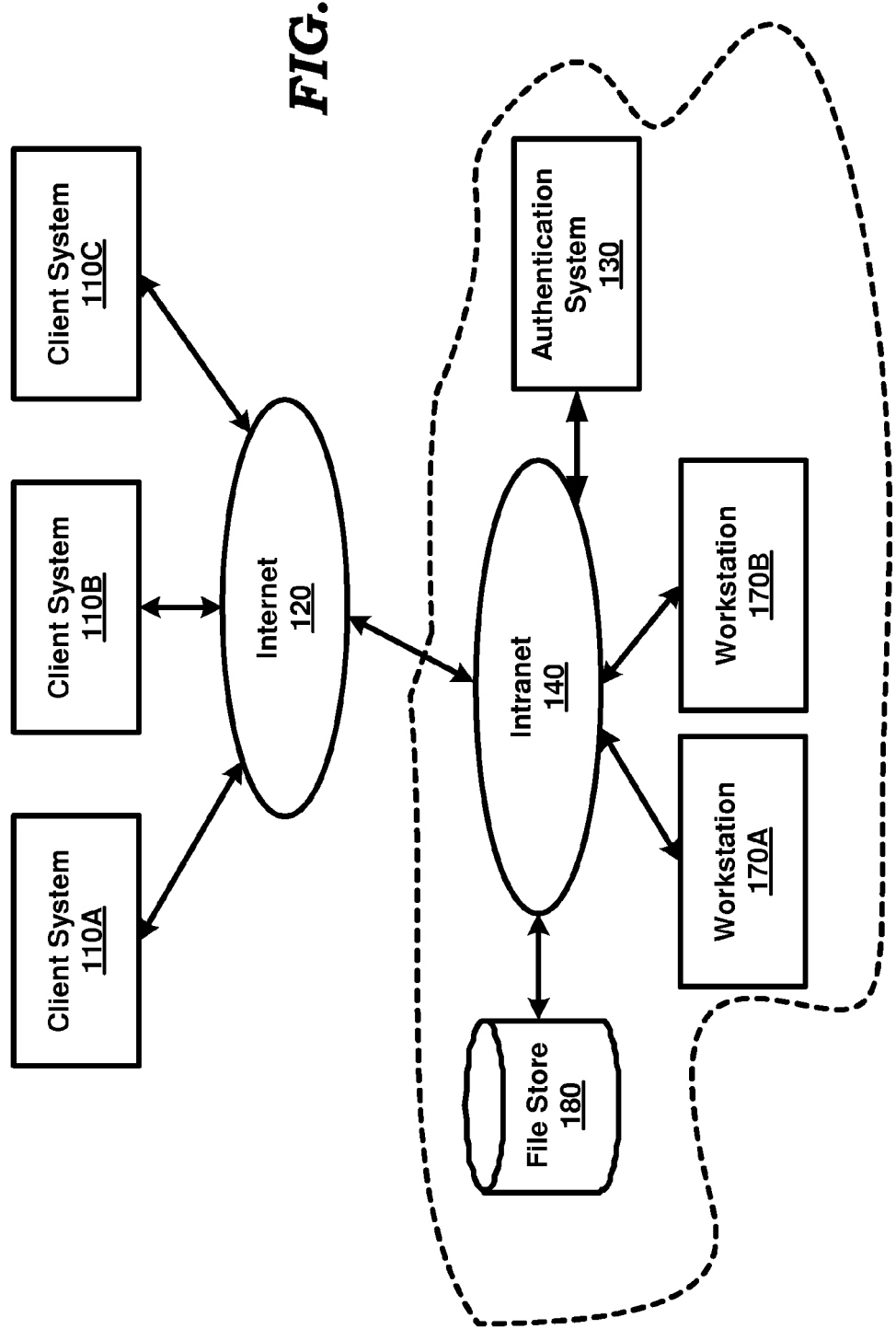
FIG. 1 is a block diagram illustrating an example environment in which several aspects of the present invention can be implemented.

FIG. 1 is a block diagram illustrating an example environment (computing system) in which several aspects of the present invention can be implemented. The block diagram is shown containing client systems 110A-110C, Internet 120, authentication system 130, intranet 140, workstations 170A-170B, and file store 180.

Merely for illustration, only representative number/type of systems are shown in the Figure. Many environments often contain many more systems, both in number and type, depending on the purpose for which the environment is designed. Each system/device of FIG. 1 is described below in further detail.

Intranet 140 represents a network providing connectivity between various systems of an enterprise (shown by a dotted boundary) such as work station 170A-170B, and file store 180. Internet 120 extends the connectivity of these (and other systems in the enterprise) with external systems such as client systems 110A-110C.

Each of Internet 120 and intranet 140 may be implemented using protocols such as Internet Protocol (IP) that is very well known in the relevant arts. In general, in IP environments, an IP packet is used as a basic unit of transport, with the source address being set to the IP address assigned to the source system from which the packet originates and the destination address set to the IP address of the target system to which the packet is to be eventually delivered.

Authentication system 130 authenticates each user based on the corresponding authentication information. A single user can be authenticated by different types of information. For example, when the user is physically at workstation 170A, a simple user identifier and password combination can be used. On the other hand, when accessing via a VPN, a different authentication mechanism (and information) can be used. Irrespective, each user is typically mapped to a single identity (e.g., a user name) once authenticated.

File store 180 represents a non-volatile storage providing storage and retrieval of documents in the form of one or more files. As is well known in the relevant arts, the documents/files are typically maintained in a hierarchy, with each document being identifiable by a corresponding document/file name and a corresponding document/file path indicating the location of the document/file in the hierarchy.

Each of the client systems 110A-110C and work stations 170A-170B represents a system such as a personal computer, laptop, mobile station/device, etc. which enables users to perform desired tasks using various instances of (the same or different) user applications. Each of the client systems/workstations may also contain other software programs such as operating system, device drivers, etc., (not shown) that provides a (common) run time environment facilitating the execution of the user applications.

During the performance of the desired tasks, a user may use the user applications (e.g., word processing applications, computer aided design tools, database software) to access various documents maintained in a local file store (such as a hard disk, not shown) associated with the client system/workstation or maintained externally in file store 180.

As described in the Background Section above, the documents recently accessed by the user may be maintained in the form of a list (hereafter "recent list") by the corresponding client system/workstation. The user may then be enabled to access the desired documents on a specific client system/workstation by merely selecting the documents from the recent list maintained on the specific client system/workstation. It may be desirable that the user be provided the recent list on a remote system (different from the client system/workstation being used by the user).

For example, a user may first access a specific document from an office system (such as workstations 170A-170B) contained in the enterprise (shown as the dotted boundary). The same user may then wish to access the specific document from a home system (such as client systems 110A-110C) external to the enterprise. Accordingly, providing the recent list maintained in the office/remote system to the user when using the home/local system enables the user to access the specific document in a convenient/simplified manner.

Various aspects of the present invention simplify access to documents accessed recently in a remote system as described below with examples.

3. Simplifying Access to Recently Accessed Remote Documents

Figure 2:
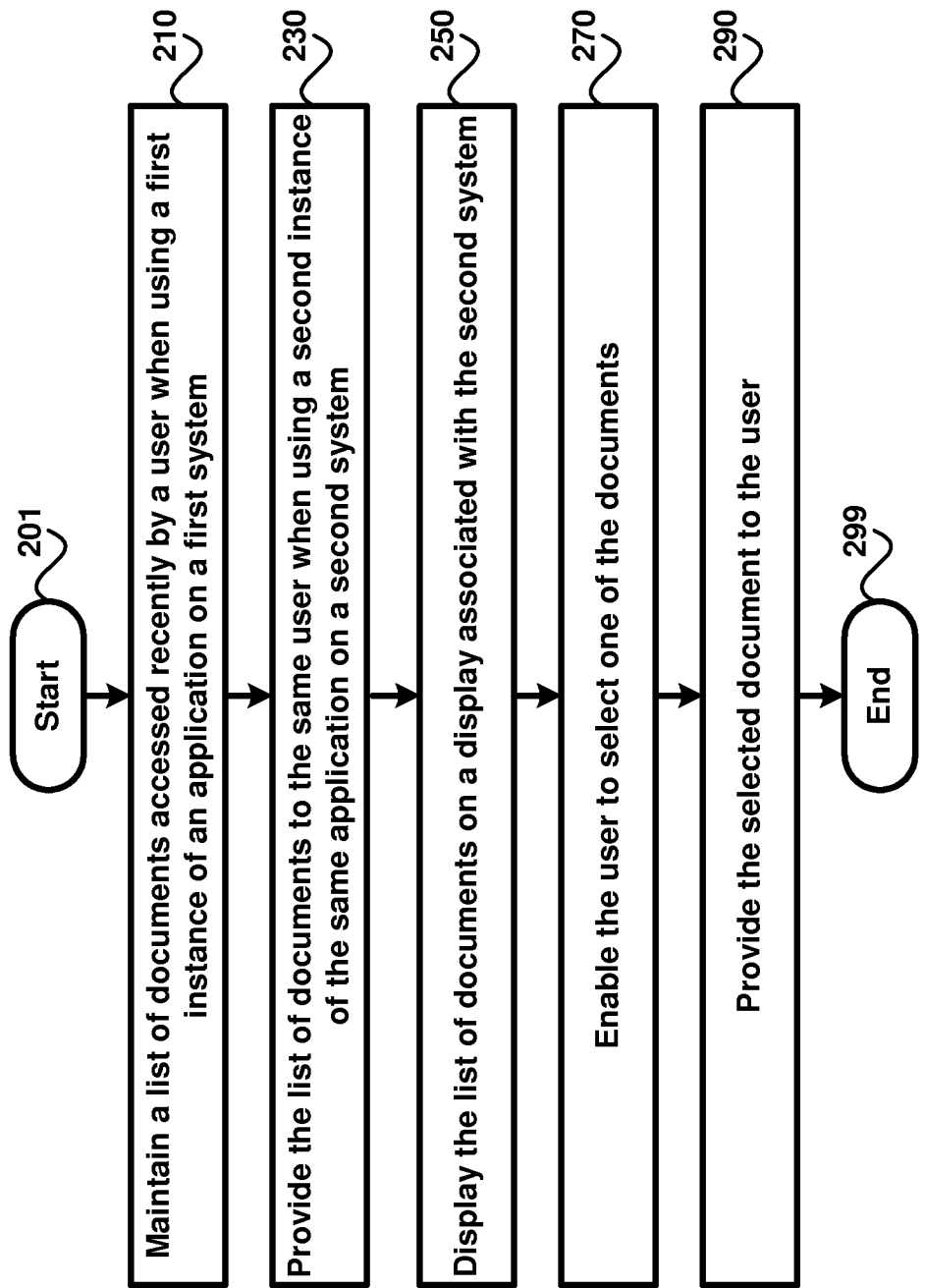
FIG. 2 is a flowchart illustrating the manner in which access to documents previously accessed in a remote system is simplified according to an aspect of the present invention.

FIG. 2 is a flowchart illustrating the manner in which the access to documents accessed recently in a remote system is simplified according to an aspect of the invention. The flowchart is described with respect to FIG. 1 merely for illustration. However, various features can be implemented in other environments also without departing from the scope and spirit of various aspects of the present invention, as will be apparent to one skilled in the relevant arts by reading the disclosure provided herein.

In addition, some of the steps may be performed in a different sequence than that depicted below, as suited in the specific environment, as will be apparent to one skilled in the relevant arts. Many of such implementations are contemplated to be covered by several aspects of the present invention.

The description is continued assuming that a local system (used by a user to access the remote documents) corresponds to one of client systems 110A-110C and that a remote system (on which the recently accessed documents are desired to be accessed by the user) corresponds to one of workstations 170A-170B. However, the local and remote systems may correspond to any two systems such as workstations 170A and 170B or alternatively to one of workstations 170A-170B and client systems 110A-110C. The flow chart begins in step 201, in which control immediately passes to step 210.

In step 210, maintain a recent list of documents accessed recently by a user when using a first instance of an application (executing) on a first/remote system (e.g. workstation 170A). As described above, a document may be deemed to be accessed by the user when the user adds, modifies, and/or deletes portions of the document, and also when the user merely opens the document (e.g., for reading/viewing the document). The documents (stored in a local storage associated with the remote system or in file store 180) may be accessed by the user using appropriate interfaces provided by the first instance of the application.

The recent list may be maintained by the first instance of the application in a local storage associated with the remote system or in any common storage (such as file store 180). The recent list may indicate the specific system (workstation 170A or file store 180) where the documents are stored, the manner of establishing a connection to the specific system, the paths and/or the names associated with each of the documents accessed in the specific system, etc.

In step 230, the recent list of documents is provided to the same user when using a second instance of the same application (executing) on a second/local system (e.g. client system 110C). The recent list may be provided by the first/remote system in response to corresponding requests received from the second/local system.

The requests may be generated using appropriate interfaces provided by the second instance of the application, for example, in response to a pre-specified user interaction. Alternatively, the second instance of the application may be designed to send requests for the recent list on commencing execution.

In step 250, the recent list of documents is displayed on a display associated with the second/local system. The documents accessed by the user may be displayed in any convenient manner, by the second instance of the application executing in the second/local system.

In one embodiment described below, only the names of the documents accessed by the user are displayed. Other information such as the specific systems where the documents are maintained, the paths where the documents are stored in the specific systems are not displayed for the convenience of the user.

In step 270, the user is provided the ability to select one of the documents from the recent list displayed. In the above embodiment, the user may select/click the document name using a pointer device (or specify a corresponding shortcut using a keyboard) to indicate the selected document of interest. In response to the selection, the second instance may be designed to send a request for the selected document to the first instance of the application to the access data (such as the first instance of the application) or to the specific system where the selected document is being maintained.

In step 290, the selected document is provided to the user. The document may be provided to the user from the remote system or from file store 180. The contents of the provided document may then be displayed on the display associated with the second/local system. The flow chart ends in step 299.

It may be appreciated that the maintenance and provision of the list of documents accessed recently by the user in a remote system enables the user to access the desired remote document in a simplified/convenient manner. The manner in which the access to remote documents is simplified is illustrated below with examples.

4. Example Illustrating Simplifying Access to Remote Documents

Figure 4:
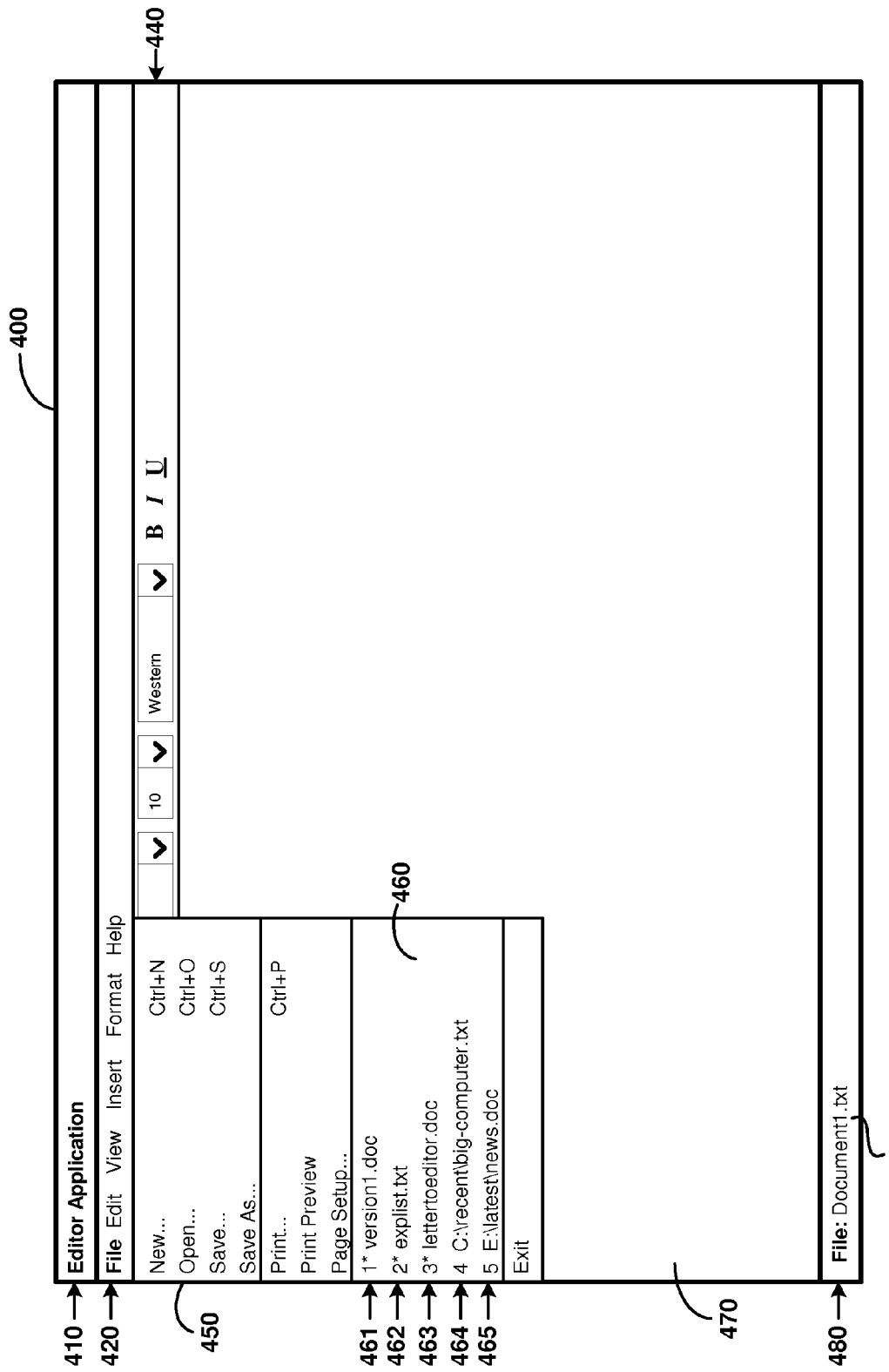
FIG. 4 depicts a portion of a display screen on a local system depicting the manner in which a user may be displayed a list of recently accessed documents, including those accessed in a remote system, in an embodiment of the present invention.

FIGS. 3 and 4 together illustrate the manner in which access to documents accessed recently in a remote system is simplified in one embodiment. Broadly, FIGS. 3 and 4 respectively depict different portions of a user interface provided by an editor application in one embodiment. In particular, the portion of FIG. 3 is provided by a first instance (of the editor application) executing on a first/remote system and enables a user to edit a document, while the portion of FIG. 4 is provided by a second instance executing on a second/local system and enables a user to select a remote document to be opened for viewing/editing from a displayed list of documents accessed recently on a remote system. Each of the Figures is described in detail below.

Referring to FIG. 3, display area 300 depicts a portion of the user interface provided by an editor application (as indicated by text 310), which enables a user to edit a document of interest. Display area 300 may be displayed on a display unit (not shown) associated with the remote system (e.g. workstation 170A) and the user may provide inputs using appropriate input devices associated with the remote system.

Menu bar 320 enables a user to access/perform the various actions provided by the editor application (for example, to add/edit/delete desired portions of the document). Toolbar 340 provides graphical/textual representations of some of the commonly used actions provided by the editor application.

Text area 370 enables the user to add/edit/delete desired portions of the document of interest or merely to view/read the contents of the document of interest. Status bar 380 displays information relevant to the document being edited, such as the system, path and name of the document concatenated together as "Z:\products\docs\version1.doc" in text 385. It may be appreciated that the system information "Z:" may refer to a local file store in the remote system or to a mapped file store on an external system (such as file store 180), as will be apparent to one skilled in the relevant arts.

Thus, a user may use the interface of display area 300 to view/edit various documents of interest. Every document being viewed/edited by the user (using the interface of display area 300) may be deemed to be accessed by the user.

Accordingly, the editor application may be designed to maintain the details of each of the viewed/edited documents as part of the recent list of documents. As described above, a user using a second/local system may wish to access the documents accessed recently by the same user in the remote system. The manner in which the user is enabled to access remote documents using a second instance of the application executing in a second/local system is described below with examples.

Referring to FIG. 4, display area 400 depicts another portion of the user interface provided by the same editor application (as indicated by text 410), which enables a user to select a document of interest from a recent list of documents. Display area 400 may be displayed on a display unit (not shown) associated with the local system (e.g. client system 110C), and the user may provide inputs using appropriate input devices associated with the local system.

Menu bar 420 being similar to menu bar 320 enables a user to access/perform the various actions provided by the editor application, for example, to select a document from a recent list. Toolbar 440 being similar to toolbar 340 provides graphical/textual representations of some of the commonly used actions provided by the editor application. Text area 470 enables the user to edit the selected document of interest, while status bar 480 displays information relevant to the selected document. Text 485 indicates a default file name/path "Document1.txt" generated by the editor application when no document has been selected/opened for editing/viewing.

Menu 450 enables a user to access/perform various actions associated with files/documents, and may be displayed in response to the user selecting the "File" option in menu bar 420 (for example, when the user clicks the "File" option using a pointer device or when the user presses the corresponding shortcut keys on a keyboard). In particular, display area 460 depicts a recent list, that is, a list of documents recently accessed by the user using the instance of the editor application.

The recent list may be maintained by the editor application, in response to the user accessing various documents maintained in the local file store associated with the local system. In one embodiment, the recent list is modified to include the documents recently accessed by the user using a first instance of the editor application on a remote system (workstations 170A). Accordingly, the editor application may be designed to first retrieve the list of remote documents (remote list) by sending requests to the remote system and processing the corresponding responses. The editor application may then add the remote list of documents to the recent list maintained on the local system.

Thus, each of rows 461-465 depicts the details of a corresponding document recently accessed by the user using the editor application either in the local system or in the remote system. It may be observed that the names of the documents "version1.doc", "explist.txt" and "lettertoeditor.doc" displayed in rows 461-463 are marked with a "*" indicating that the documents have been recently accessed by the same user in a remote system (different from the local system). In contrast, row 464 "C:\recent\big-computer.txt" and row 465 "E:\latest\news.doc" are shown without the "*" mark indicating that they represent documents that have been accessed from the local system.

It may be noted that the document "version1.doc" (row 461) in the recent list corresponds to the document edited by the user using the interface of display area 300 (as indicated by text 385) provided by a first instance of the editor application in a remote system (workstation 170A). Thus, a user may use the interface of display area 400 to select/access various documents of interest from a list of documents recently accessed by the user on remote systems.

The selected documents may then be provided to the user, thereby enabling the user to view/edit/modify the selected document similar to the manner described above with respect to display area 300. The changed document may then be saved back to replace the retrieved document.

Thus, the access to documents accessed recently using a remote system is simplified. It may be appreciated that the various aspects of the present invention may be implemented in any desired/convenient manner. An example implementation is described below with examples.

5. Example Implementation

Figure 5:
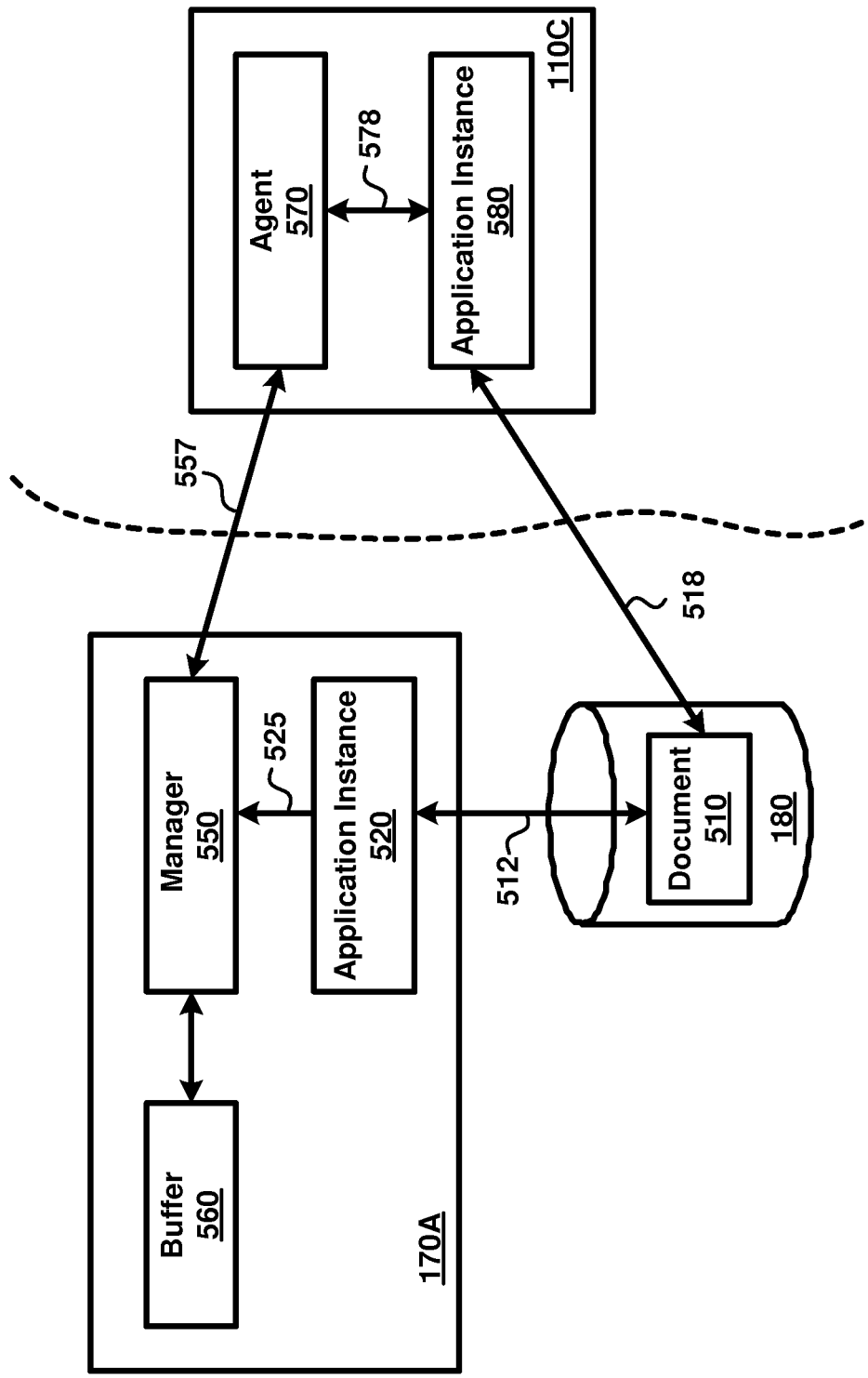
FIG. 5 is a block diagram illustrating the details of example implementations of a local system and a remote system in an embodiment of the present invention.

FIG. 5 is a block diagram illustrating the manner in which access (from a local system) to documents accessed recently on a remote system is implemented in one embodiment. The block diagram is shown containing document 510, application instances 520 and 580, agent 570, manager 550 and buffer 560. Each of the blocks is described in detail below.

Application instance 520 represents a first instance of an application (such as the editor application described above) executing in the runtime environment of workstation 170A (remote/first system). On execution, application instance 520 may display (on a display unit not shown) a user interface similar to display area 300 which enables a user to edit documents.

On receiving an indication that a specific document (such as document 510 stored in file server 180) is to be edited, application instance 520 retrieves (via path 512) the selected document and then displays the content in display area 370. Document 510 may represent the document being edited by a user using display area 300 and as such may be associated with the system, path and name "Z:\products\docs\version1.doc". Application instance 520 may then modify document 510 according to the actions (adding/editing/deleting) indicated by the user. The modified document may be stored in document 510.

As described above, application instance 520 may also maintain a list of documents (including document 510) recently accessed by the user. The list of documents may be maintained in volatile/non-volatile memory (not shown) in workstations 170A and may be provided to manager 550 (via path 525).

Manager 550 represents a software executing in the runtime environment of workstation 170A. Though shown in conjunction with a single application, manager 550 may receive information on the documents accessed by the same user using different applications. Furthermore, manager 550 may execute on other systems, though shown as executing in the runtime environment of work station 170A.

In the context of FIG. 5, manager 550 receives the list of documents accessed recently using the editor application from application instance 520. Alternatively, manager 550 may be designed to maintain the recent list of documents accessed by application instance 520. For example, manager 550 may implement a callback method for the "Open" event (indicating that a document is being accessed), thereby causing the callback method to be invoked for each document accessed by application instance 520 and as such enabling manager 550 to maintain the recent list of documents.

In one embodiment, manager 550 receives the recent list from application instance 520 and maintains the received recent list in buffer 560. Buffer 560 represents a volatile/non-volatile memory providing storage and retrieval of data. The manner in which the recent list is maintained in buffer 560 in one embodiment is described below with examples.

FIG. 6A depicts a portion of a recent list maintained by a remote system (in particular, by manager 550 in buffer 560) in one embodiment. Though the content of FIGS. 6A and 6B is shown encoded in extensible markup language (XML) according to one convention, other encoding/formats and conventions may be used for representing the data.

Lines 621-639 represents the element "ManagerConfig" (between the corresponding start tag "<ManagerConfig>" and the end tag "</ManagerConfig>") specifying the details of the recent list maintained in the remote system (by manager 550). The value "Editor" of the attribute "application" in line 621 indicates that the recent list corresponds to documents accessed using an editor application (such as document 510).

In lines 622-638, element "DocumentList" specifies the documents that have been recently accessed by user "Bagha" (the value of the attribute "username" in line 622) using a first instance of the editor application (for example, application instance 520) in the remote system workstation 170A. The value "10" of the attribute "maxCount" in line 622 specifies the maximum number of documents to be maintained in the recent list for the user "Bagha". The values for the attributes "username" and/or "maxCount" may be generated by the first instance of the application or alternatively specified by the user using appropriate interfaces provided by the first instance.

Each of lines 623-627, 628-632, 633-637 (element "Document") specify the details of corresponding documents that have been recently accessed by the user "Bagha" using application instance 520. In particular, lines 623-627 specifies a document uniquely identified by the value "1" (the value of the attribute "id" in line 623) having the name "versions1.doc" (line 624), located at the system and path "Z:\products\docs" (line 625), and which was last accessed on "11-June-2008 09.22 AM" (line 626). Similarly lines 628-632, 633-637 specify the details of other corresponding recently accessed documents.

It may be observed that the document specified in lines 623-627 corresponds to document 510 (as indicated by the concatenation of the system, path and name of the document), which was accessed for editing in text area 370. It may also be observed that the location type is marked as "mapped" (line 625) indicating that the corresponding document named "version1.doc" is stored in a file store external to the remote system workstation 170A (for example, in file store 180).

Thus, manager 550 maintains (in buffer 560) the list of documents recently accessed by a user on the remote system workstation 170A. As described above, the same user may desire to access the remote documents from a local/second system. In one embodiment, the user may wish to access the documents from client system 110C located external to the enterprise (as indicated by the dotted boundary).

Referring to FIG. 5, application instance 580 represents a second instance of the same editor application executing in the runtime environment of client system 110C (local/second system). On execution, application instance 580 may display (on a display unit not shown) a user interface similar to display area 400 which enables a user to select a document from a recent list of documents. In one embodiment, upon instantiation (which in turn occurs upon initiation of execution of the application), application instance 580 sends (via path 578) a request to agent 570 for retrieving the list of documents accessed recently by the user on remote systems.

Agent 570 represents a software executing in the runtime environment of client system 110C and/or application instance 580. In response to receiving (via path 578) a request from application instance 580 for retrieving recent lists from remote systems of interest, agent 570 first inspects a configuration data specifying the details of connecting to the remote systems of interest. The manner in which the configuration data is specified in one embodiment is described below with examples.

FIG. 6B depicts a portion of a configuration data indicating the manner of connecting to remote systems (from which recent lists are to be retrieved) in one embodiment. The configuration data may be specified by a user (using appropriate interfaces) or pre-configured and may be maintained by agent 570 in a volatile/non-volatile memory (not shown) in client system 110C.

In lines 671-685, element "AgentConfig" specifies the details of the configuration data for the editor application (as indicated by the value "Editor" for the attribute "application" in line 671). In lines 672-684, element "ManagerList" specifies the details of the (manager software executing in the) remote systems of interest from which recent lists are to be retrieved for the user "Bagha" (the value of the attribute "username" in line 672).

Each of lines 673-678, 679-683 (elements "Manager") specify the details of the corresponding managers executing in a corresponding remote system. Lines 673-678 specify the details of the manager uniquely identified by the identifier "1" (value of the attribute "id" in line 673) while lines 674-677 (element "Connection") specifies the details of establishing a connection with the manager such as the (IP) address "120.3.40.2", the type of connection "VPN" (indicated respectively by the values of the attributes "address" and "type" in line 674), and the parameters to be used when establishing connection (element "parameter" in lines 675 and 676). Similarly, lines 679-683 specify the details of another manger executing in another remote system.

Thus, in one embodiment, agent 570, in response to receiving a request from application instance 580, first retrieves the configuration data (of FIG. 6B) and then determines the specific remote systems to be accessed. Agent 570 may then establish connections with each of the manager software modules (executing in the remote systems) for retrieving the corresponding remote list. The description is continued assuming that the connection to the managers is established in the order specified in the configuration data.

Further, it is assumed that the details of the manager specified in lines 674-677 corresponds to manager 550. Accordingly, referring to FIG. 5, agent 570 first establishes a virtual private network connection (as shown by path 557) with manager 550 (executing in workstation 170A) using the username "dijmathew" and the password "zipzap" (as indicated by lines 674-677 of the configuration data).

In general, a virtual private network (VPN) connection established between a system external to an enterprise (such as client systems 110A-110C) and a system in the enterprise (such as workstations 170A-170B) enables the external system to behave as part of the enterprise, thereby enabling users to access (remote) documents stored in an enterprise (shown by the dotted boundary) in a secured/encrypted manner. A VPN connection may be established using a combination of network elements (including authentication server 130) present in Internet 120 and intranet 140.

The manner, in which a VPN is established, the documents are transferred/retrieved and/or updated over the network using the VPN, etc., will be obvious to one skilled in the relevant arts and therefore not described here for conciseness. However, it is sufficient to understand that agent 570 can communicate with manager 550 (and other systems 170A/170B/180) upon appropriate authentication of the user.

Agent 570, after establishing the connection with manager 550, may send a request (via path 557) for retrieving the list of documents recently accessed on the remote system workstation 170A. The request may further indicate that only the documents accessed by a specific application (such as "Editor") and by a specific user (such as "Bagha") are to be retrieved.

On receiving such a request, manager 550 may determine the specific documents accessed by the specific user using the specific application (as specified in the request). Accordingly, manager 550 may determine that the document list specified by lines 622-638 represents the list of documents accessed recently by the user "Bagha" using the "Editor" application. Manager 550 may retrieve the document list from buffer 560 and then send (via path 557) the determined/retrieved document list to agent 570 as a response to the request.

Similarly, agent 570 may receive other (remote) lists of documents from other remote systems (not described here for conciseness). The retrieved remote lists (individually or in combination) may then be sent by agent 570 as a response to the request received from application instance 580 (via path 578).

Thus, application instance 580 retrieves the (remote) list of documents accessed recently by the user on remote systems. In one embodiment, application instance 580 displays the name of the documents in the retrieved remote lists as part of the recent list (display area 460 of FIG. 4). Accordingly, documents "version1.doc" (document 510), "explist.txt" and "lettertoeditor.doc" accessed by the user "Bagha" in the remote system workstation 170A (as indicated by lines 622-638) are displayed as corresponding rows 461, 462, 463 in display area 460.

As described above, the user is provided the ability to select a document of interest (for example, row 461 corresponding to document 510) from the recent list displayed in display area 460. In response to the user selecting a remote document (such as document 510), application instance 580 may establish a connection with the system storing the document, for example, file store 180. Document 510 may then be retrieved (via path 518) and the contents of document 510 may then be displayed in display area 370 of FIG. 3. The user may then make desired modifications to document 510.

Thus, assuming a corporate user accesses the document of FIG. 3 using workstation 170A at work/enterprise and thereafter leaves for home, and executes the same application on client system 110C at home, the user may easily access the recent documents accessed even at work. Therefore, there may be contiguity to working from office to home, thereby enhancing the employee productivity.

It should be further appreciated that the above-described features may be implemented in a combination of one or more of hardware, software, and firmware (though the below embodiment is described as being implemented in the form of software instructions). The description is continued with respect to an embodiment in which various features are operative by execution of corresponding software instructions.

6. Digital Processing System

Figure 7:
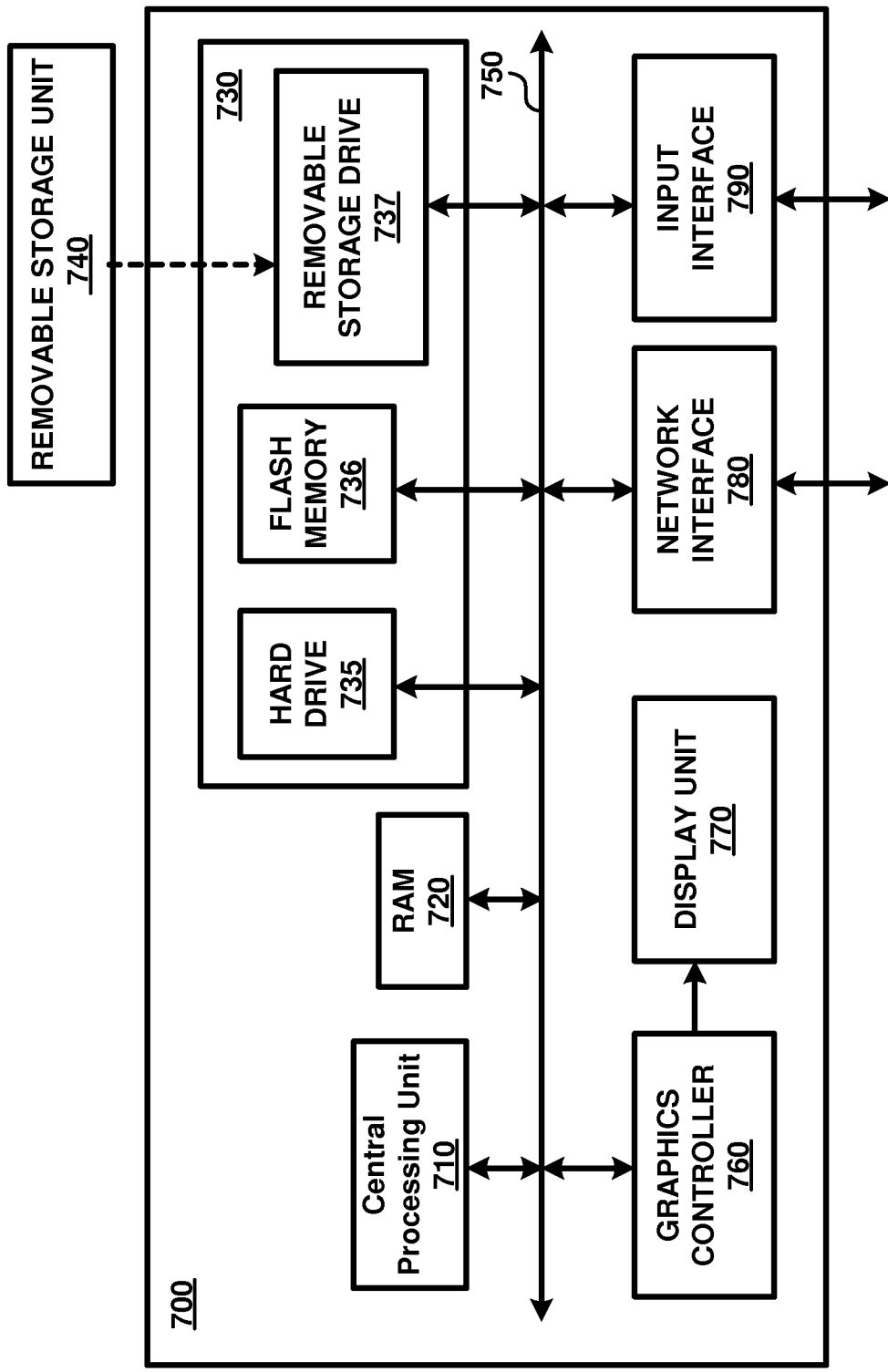
FIG. 7 is a block diagram of a digital processing system in which several aspects of the present invention are operative upon execution of corresponding software instructions.

FIG. 7 is a block diagram illustrating the details of digital processing system 700 in which various aspects of the present invention are operative by execution of appropriate software instructions. Digital processing system 700 may correspond to a local system (such as client systems 110A-110C) or a remote system (such as workstation 170A-170B).

Digital processing system 700 may contain one or more processors such as a central processing unit (CPU) 710, random access memory (RAM) 720, secondary memory 730, graphics controller 760, display unit 770, network interface 780, and input interface 790. All the components except display unit 770 may communicate with each other over communication path 750, which may contain several buses as is well known in the relevant arts. The components of FIG. 7 are described below in further detail.

CPU 710 may execute instructions stored in RAM 720 to provide several features of the present invention. CPU 710 may contain multiple processing units, with each processing unit potentially being designed for a specific task. Alternatively, CPU 710 may contain only a single general-purpose processing unit. RAM 720 may receive instructions from secondary memory 730 using communication path 750.

Graphics controller 760 generates display signals (e.g., in RGB format) to display unit 770 based on data/instructions received from CPU 710. Display unit 770 contains a display screen to display the images (e.g., portions of screens depicted in FIGS. 3 and 4) defined by the display signals. Input interface 790 may correspond to a keyboard and a pointing device (e.g., touch-pad, mouse) and may be used to provide inputs (e.g., those depicted in FIGS. 3 and 4).

Network interface 780 provides connectivity to a network (e.g., using Internet Protocol), and may be used to communicate with other connected systems (such as client systems 110A-110C, workstations 170A-170B and file store 180) of FIG. 1.

Secondary memory 730 may contain hard drive 735, flash memory 736, and removable storage drive 737. Secondary memory 730 may store the data (e.g., portions of data depicted in FIGS. 6A and 6B) and software instructions, which enable digital processing system 700 to provide several features in accordance with the present invention.

Some or all of the data and instructions may be provided on removable storage unit 740, and the data and instructions may be read and provided by removable storage drive 737 to CPU 710. Floppy drive, magnetic tape drive, CD-ROM drive, DVD Drive, Flash memory, removable memory chip (PCMCIA Card, EPROM) are examples of such removable storage drive 737.

Removable storage unit 740 may be implemented using medium and storage format compatible with removable storage drive 737 such that removable storage drive 737 can read the data and instructions. Thus, removable storage unit 740 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 740 or hard disk installed in hard drive 735. These computer program products are means for providing software to digital processing system 700. CPU 710 may retrieve the software instructions, and execute the instructions to provide various features of the present invention described above.

It should be understood that numerous specific details, relationships, and methods are set forth to provide a full understanding of the invention. For example, many of the functions units described in this specification have been labeled as modules/blocks in order to more particularly emphasize their implementation independence.

A module/block may be implemented as a hardware circuit containing custom very large scale integration circuits or gate arrays, off-the-shelf semiconductors such as logic chips, transistors or other discrete components. A module/block may also be implemented in programmable hardware devices such as field programmable gate arrays, programmable array logic, programmable logic devices, or the like.

Modules/blocks may also be implemented in software for execution by various types of processors. An identified module of executable code may, for instance, contain one or more physical or logical blocks of computer instructions which may, for instance, be organized as an object, procedure, or function. Nevertheless, the executables of an identified module need not be physically located together, but may contain disparate instructions stored in different locations which when joined logically together constitute the module/block and achieve the stated purpose for the module/block.

It may be appreciated that a module/block of executable code could be a single instruction, or many instructions and may even be distributed over several code segments, among different programs, and across several memory devices. Further, the functionality described with reference to a single module/block can be split across multiple modules/blocks or alternatively the functionality described with respect to multiple modules/blocks can be combined into a single (or other combination of blocks) as will be apparent to a skilled practitioner based on the disclosure provided herein.

Reference throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

Furthermore, the described features, structures, or characteristics of the invention may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the invention.

7. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

It should be understood that the figures and/or screen shots illustrated in the attachments highlighting the functionality and advantages of the present invention are presented for example purposes only. The present invention is sufficiently flexible and configurable, such that it may be utilized in ways other than that shown in the accompanying figures.

Further, the purpose of the following Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A computing system comprising:
a first digital processing system in which a user executes a first instance of a content editor application and accesses a first set of documents using the first instance, wherein the first instance of the content editor application provides a first user interface in the first digital processing system to display content of documents, wherein is a document is considered to have been accessed if content of the document is displayed in the first user interface;
a manager module to maintain a first list specifying the first set of documents accessed by the user in the first digital processing system; and
a second digital processing system, geographically distant from the first processing system, in which the user executes a second instance of the content editor application, the second instance of the content editor application being operable to:
provide a second user interface in the second digital processing system to display and edit content of a document of interest selected by the user;
receive, from within the second user interface provided by the second instance of the content editor application, a request for a recent list specifying documents recently accessed by the user using the content editor application;
retrieve the first list by interfacing with the manager module; and
display the first list along with a second list as the recent list in response to the request, wherein the second list contains a second set of documents accessed by the user using the second instance before the user executes the second instance of the content editor application, wherein
the first set of documents is different and distinct from the second set of documents,
the user is able to select a specific second document from the recent list as the document of interest to display and edit content of the specific document directly in the second user interface, and
the recent list contains the documents recently accessed by the first and second instances of the content editor application, but not any other application.

2. The computing system of claim 1, wherein the second user interface comprises a menu bar containing a plurality of options, wherein the request is received upon the user selecting a first option of the plurality of options, wherein the first option is a File Option.

3. The computing system of claim 1, wherein the second instance is further operable to:
receive an indication that the user has selected the specific document from the first list displayed in the recent list;
get the specific document from the first digital processing system; and
display content of the specific document to the user in the second user interface on the second digital processing system.

4. The computing system of claim 2, wherein the second digital processing system stores a configuration file indicating an address of the first digital processing system and an authentication information of the user, wherein to retrieve the first list and to get the specific document, the second instance communicates with the first digital processing system using the address and provides the authentication information to the first digital processing system.

5. The computing system of claim 4, wherein the first digital processing system is located in an office of an enterprise and the second digital processing system is located in a home of the user such that the user at home can easily access the first set of documents from the office.

6. The computing system of claim 1, wherein the manager module stores the first list in a non-volatile memory when the user accesses the first set of documents using the first instance of the content editor application in the first digital processing system, wherein the stored first list is associated with an identifier of the content editor application, the manager module retrieves the first list from the non-volatile memory upon receiving a request based on the identifier for the first list from the second instance of the content editor application.

7. The computing system of claim 6, wherein the user is enabled to specify a number of documents to be maintained in the first list, wherein the manager module maintains only the number of documents in the first list.

8. The computing system of claim 7, wherein the first list is stored in the form of Extensible Markup Language (XML) data and wherein the manager module is also executed on the first digital processing system.

9. The computing system of claim 1, wherein the first list is stored associated with an identifier of the content editor application, and the first list is retrieved upon receiving a request for the first list based on the identifier from the second instance of the content editor application.

10. A method of enabling a user to edit documents, the method being performed in a second digital processing system, the method comprising:
providing, by a second instance of a content editor application, a user interface in the second digital processing system to display and edit content of a document of interest selected by the user;
receiving, from within the user interface provided by the second instance of the content editor application, a request for a recent list specifying documents recently accessed by the user using the content editor application;
retrieving, by interfacing with a first digital processing system, a first list specifying a first set of documents accessed by the user using a first instance of the content editor application in the first digital processing system, wherein the first digital processing system is geographically distant from the second digital processing system; and
displaying the first list along with a second list as the recent list in response to the request, wherein
the second list contains a second set of documents accessed by the user using the second instance before the user executes the second instance of the content editor application,
the first set of documents is different and distinct from the second set of documents, the user selects a specific document from the recent list as the document of interest to display and edit the content of the specific document directly in the user interface, and the recent list contains the documents recently accessed by the first and second instances of the content editor application, but not any other application.

11. The method of claim 10, wherein the user interface comprises a menu bar containing a plurality of options, wherein the request is received upon the user selecting a first option of the plurality of options, wherein the first option is a File Option.

12. The method of claim 10, further comprising:
receiving an indication that the user has selected the specific document from the first list displayed in the recent list;
getting the specific document from the first digital processing system; and
displaying content of the specific document to the user in the user interface on the second digital processing system.

13. The method of claim 12, further comprising:
storing a configuration file indicating an address of the first digital processing system and an authentication information of the user, wherein for the retrieving the first list and the getting the second document, the second instance communicates with the first digital processing system using the address and provides the authentication information to the first digital processing system.

14. The method of claim 13, wherein the first digital processing system is located in an office of an enterprise and the second digital processing system is located in a home of the user such that the user at home can easily access the first set of documents from the office.

15. The method of claim 10, wherein the first list is stored associated with an identifier of the content editor application, and the first list is retrieved upon receiving a request for the first list based on the identifier from the second instance of the content editor application.

16. A non-transitory machine readable medium storing one or more sequences of instructions causing a second digital processing system to enable a user to edit documents, wherein execution of the one or more sequences of instructions by one or more processors contained in the second digital processing system causes the second processing digital system to perform the following actions of:
providing, by a second instance of a content editor application, a user interface in the second digital processing system to display and edit content of a document of interest selected by the user;
receiving, from within the user interface provided by the second instance of the content editor application, a request for a recent list specifying documents recently accessed by the user using the content editor application:
retrieving, by interfacing with a first digital processing system, a first list specifying a first set of documents accessed by the user using a first instance of the content editor application in the first digital processing system, wherein the first digital processing system is geographically distant from the second digital processing system; and
displaying the first list along with a second list as the recent list in response to the request, wherein the second list contains a second set of documents accessed by the user using the second instance before the user executes the second instance of the content editor application,
the first set of documents is different and distinct from the second set of documents,
the user selects a specific document from the recent list as the document of interest to display and edit the content of the specific document directly in the user interface, and
the recent list contains the documents recently accessed by the first and second instances of the content editor application, but not any other application.

17. The non-transitory machine readable medium of claim 16, wherein the user interface comprises a menu bar containing a plurality of options, wherein the request is received upon the user selecting a first option of the plurality of options, wherein the first option is a File Option.

18. The non-transitory machine readable medium of claim 16, further comprising one or more instructions for:
receiving an indication that the user has selected the specific document of the first list displayed in the recent list;
getting the specific document from the first digital processing system; and
displaying content of the specific document to the user in the user interface on the second digital processing system.

19. The non-transitory machine readable medium of claim 18, further comprising one or more instructions:
storing a configuration file indicating an address of the first digital processing system and an authentication information of the user, wherein for the retrieving the first list and the getting the second document, the second instance communicates with the first digital processing system using the address and provides the authentication information to the first digital processing system.

20. The non-transitory machine readable medium of claim 19, wherein the first digital processing system is located in an office of an enterprise and the second digital processing system is located in a home of the user such that the user at home can easily access the first set of documents from the office.

21. The non-transitory machine readable medium of claim 16, wherein the first list is stored associated with an identifier of the content editor application, and the first list is retrieved upon receiving a request for the first list based on the identifier from the second instance of the content editor application.

22. A second digital processing system comprising:
a processor; a random access memory (RAM);
a machine readable medium to store one or more instructions, which when retrieved into the RAM and executed by the processor causes the digital processing system to enable a user to edit documents, the digital processing system performing the following actions of:
providing, by a second instance of a content editor application, a user interface in the second digital processing system to display and edit content of a document of interest selected by the user;
receiving, from within the user interface provided by the editor application, a request for a recent list specifying documents recently accessed by the user using the content editor application;
retrieving, by interfacing with a first digital processing system, a first list specifying a first set of documents accessed by the user using a first instance of the content editor application in the first digital processing system, wherein the first digital processing system is geographically distant from the second digital processing system; and displaying the first list along with a second list as the recent list in response to the request, wherein the second list contains a second set of documents accessed by the user using the second instance before the user executes the second instance of the content editor application, the first set of documents is different and distinct from the second set of documents, the user selects a specific document from the recent list as the document of interest to display and edit the content of the specific document directly in the user interface, and the recent list contains the documents recently accessed by the first and second instances of the content editor application, but not any other application.

23. The digital processing system of claim 22, wherein the first digital processing system is located in an office of an enterprise in and the second digital processing system is located in a home of the user such that the user at home can easily access the first set of documents from the office.

24. A non-transitory machine readable medium storing one or more sequences of instructions causing a second digital processing system to enable a user to edit documents, wherein execution of the one or more sequences of instructions by one or more processors contained in the second digital processing system causes the second processing digital system to perform the following actions of:

providing, by a second instance of a content editor application, a user interface in the second digital processing system to display and edit content of a document of interest selected by the user;

receiving, from within the user interface provided by the second instance of the content editor application, a request for a recent list specifying documents recently accessed by the user using the content editor application;

retrieving, by interfacing with a first digital processing system, a first list specifying a first set of documents accessed by the user using a first instance of the content editor application in the first digital processing system, wherein the first digital processing system is geographically distant from the second digital processing system:

displaying the first list along with a second list as the recent list in response to the request, wherein the second list contains a second set of documents accessed by the user using the second instance before the user executes the second instance of the content editor application, the first set of documents is different and distinct from the second set of documents, the user selects a specific document from the recent list as the document of interest to display and edit the content of the specific document directly in the user interface, and the first list is stored associated with an identifier of the content editor application, and the first list is retrieved upon receiving a request for the first list based on the identifier from the second instance of the content editor application.

25. The non-transitory machine readable medium of claim 24, wherein the recent list contains only documents accessed using the content editor application, but not any other application.

* * * * *

UNITED STATES PATENT AND TRADEMARK OFFICE
CERTIFICATE OF CORRECTION

PATENT NO. : 9,710,443 B2
APPLICATION NO. : 12/176414
DATED : July 18, 2017
INVENTOR(S) : Srinivasan Page 1 of 1

It is certified that error appears in the above-identified patent and that said Letters Patent is hereby corrected as shown below:

In the Claims

In Column 13, Line 20, in Claim 1, delete "is a" and insert -- a --, therefor.

In Column 14, Line 4, in Claim 4, delete "claim 2," and insert -- claim 3, --, therefor.

In Column 15, Lines 57-58, in Claim 16, delete "application:" insert -- application; --, therefor.

In Column 17, Line 24, in Claim 23, after "enterprise" delete "in".

In Column 18, Line 12, in Claim 24, delete "system:" and insert -- system; and --, therefor.

Signed and Sealed this
Thirteenth Day of February, 2018

Andrei Iancu
*Director of the United States Patent and Trademark Office*